J. M. WARD.
Fruit Drier.
No. 97,006. Patented Nov. 16, 1869.
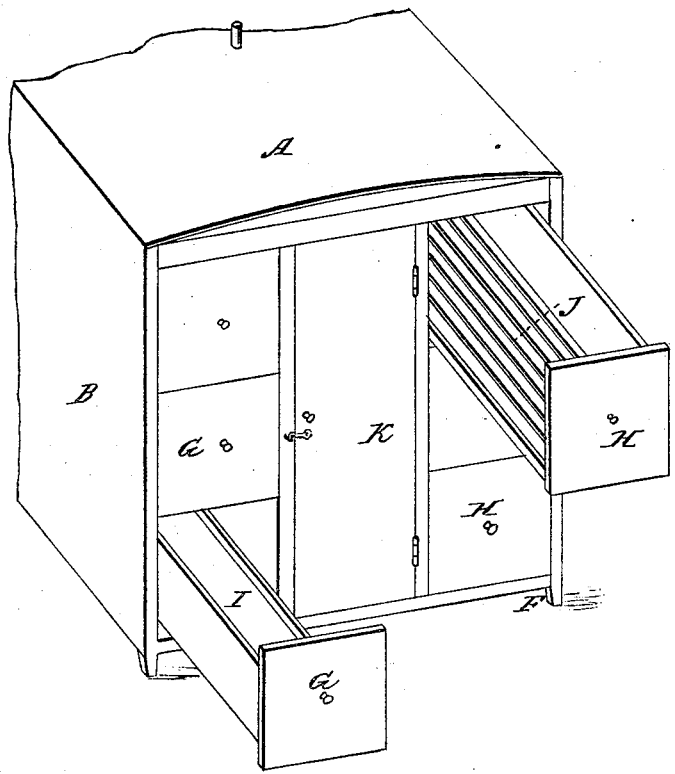
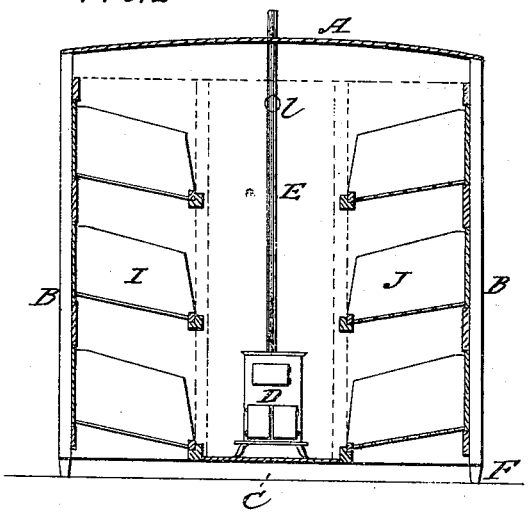
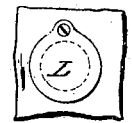
ATTEST:
William F. Bauer
Sam'l Knight
INVENTOR:
John Ward
By Knight Bros
Atty

United States Patent Office.

JOSEPH M. WARD, OF OXFORD, OHIO, ASSIGNOR TO HIMSELF AND THOMAS B. WHITE, OF SAME PLACE.

Letters Patent No. 97,006, dated November 16, 1869.

---

DRIER.

---

The Schedule referred to in these Letters Patent and making part of the same.

---

*To whom it may concern:*

Be it known that I, JOSEPH M. WARD, of Oxford, Butler county, Ohio, have invented a certain new and useful Improvement in Portable Fruit-Drying Houses; and I hereby declare the following to be a full, clear, and exact description thereof, reference being had to the accompanying drawings, making part of this specification.

My invention relates, primarily, to a fruit-drying house, which is made of such a size as to be removable from place to place, and which has drawers to contain the fruit, which are withdrawn or inserted from the outside.

My improvement consists in providing the drawers with inclined bottoms, to facilitate the handling and inspection of the fruit thereon, and its removal, and also in connection with their arrangement relatively to the stove hereinafter described, to cause the heated air to be circulated beneath and through them more perfectly.

In the drawings—

Figure 1 is a perspective view of a drying-house, embodying my improvement, two of the drawers being partially open to show the construction of the same.

Figure 2 is a section transversely of the drawers.

Figure 3 is a diagram showing the damper.

A is the top, and B, the sides of my fruit-drying house, which may be made about four feet square.

C is a floor, extending from front to rear, and giving support to a stove, D, whose chimney E extends through the top A.

At each side of the floor C is an open space for ingress of air, which passes beneath the sides B, the house being sustained upon legs F, which serve to keep the sides clear of the ground or floor upon which the house may stand.

At each side of the central space containing the stove is a vertical series of drawers, G and H.

The said drawers have bottoms I J sloping toward the stove, and the inner sides of the drawers are cut away nearly to the bottom, to allow free circulation of air upon that side. The bottoms I of the series of drawers G are formed of thin boards, and are close, or have no apertures. These drawers are for the purpose of holding small fruit, such as currants, raspberries, &c. The bottoms J of the drawers H are formed of slats, to allow the upward passage of air among the fruit which they contain.

K is a door to the chamber.

L is a damper, which is placed over an aperture, *l*, in the rear wall.

The operation is as follows:

The fire having been lighted, the prepared fruit is placed in the drawers, which are then pushed into place. The air in the chamber being heated, absorbs moisture from the fruit, and is allowed to escape as fast as is desired through the aperture *l*.

It will be seen that the change of air is entirely under control of the operator, as the air within the chamber is so much lighter than that upon the outside as to be prevented from passing beneath the sides, and can only find exit by the aperture *l*, the cold air flowing beneath the walls to take the place vacated by the heated and moistened air which passes out.

It is found much more convenient to handle fruit from the outside, as the use of drawers allows me to do, than to enter the highly-heated atmosphere of the house to examine the progress of the operation, and to remove the fruit when sufficiently dried.

It will also be seen that much time, fuel, and heated air are wasted by the opening of the door to admit the operator and the necessary light.

Inclination is given to the bottoms of the drawers for convenience in handling and removal of fruit, and to exhibit the same more clearly to the attendant. This inclination also causes the heated air rising from the stove to pass beneath the drawer-bottoms toward the sides, from whence it is again brought to the stove, thus establishing a continued circulation of air, which would not occur to nearly the same extent if the drawer-bottoms were horizontal.

I claim herein as new, and of my invention—

The drawers G H, constructed with inclined bottoms I J, and arranged, relatively to the stove D, as herein shown and described, for the purposes set forth.

In testimony of which invention, I hereunto set my hand.

JOSEPH M. WARD.

Witnesses:
GEO. H. KNIGHT,
JAMES H. LAYMAN.